(12) United States Patent
Moyal et al.

(10) Patent No.: US 6,807,638 B1
(45) Date of Patent: Oct. 19, 2004

(54) APPARATUS FOR AND METHOD OF IN-BAND CLOCK COMPENSATION

(75) Inventors: Yehuda Moyal, Ra'anana (IL); Yehezkel Levi, Bat Yam (IL); Ilan Glaser, Tel Aviv (IL); Simon Grinberg, Modiin (IL)

(73) Assignee: Cisco Systems O.I.A. (1988) Ltd., Herzelia (IL)

( * ) Notice: Subject to any disclaimer, the term of this patent is extended or adjusted under 35 U.S.C. 154(b) by 648 days.

(21) Appl. No.: 09/751,428

(22) Filed: Dec. 29, 2000

(51) Int. Cl.[7] .................................................. H04L 7/00
(52) U.S. Cl. ........................ 713/400; 375/363; 375/372
(58) Field of Search ........................................ 713/400

(56) References Cited

U.S. PATENT DOCUMENTS

| | | | | |
|---|---|---|---|---|
| 5,534,944 A | * | 7/1996 | Egawa et al. | 348/584 |
| 5,742,798 A | | 4/1998 | Goldrian | 395/551 |
| 5,812,835 A | | 9/1998 | Ruuskanen | 395/558 |
| 5,999,032 A | | 12/1999 | Wang et al. | 327/292 |
| 6,005,872 A | * | 12/1999 | Bassi et al. | 370/477 |
| 6,122,668 A | * | 9/2000 | Teng et al. | 709/231 |
| 6,192,092 B1 | | 2/2001 | Dizon et al. | 375/371 |
| 6,584,535 B1 | * | 6/2003 | Ouellet et al. | 710/305 |

FOREIGN PATENT DOCUMENTS

EP          558136 A1 *  9/1993  ............. H04J/3/07

* cited by examiner

Primary Examiner—Lynne H. Browne
Assistant Examiner—Eric Chang
(74) Attorney, Agent, or Firm—Schwegman, Lundberg, Woessner & Kluth, P.A.

(57) ABSTRACT

A novel and useful apparatus for and method of in-band clock compensation for use in synchronous communication systems. The clock compensation mechanism is implemented in each module and is operative to compensate for the differences between the clocks among the various modules in the system. The mechanism operates in band wherein special clock compensation symbols are periodically inserted into the data stream itself. Additional clock sync symbols are added to the data stream depending on the current level of the FIFO queue on the module or card. The insertion (or non-insertion) of additional symbols functions to compensate for the faster (or slower) clock of the module when compared to that of the reference.

50 Claims, 6 Drawing Sheets

APPARATUS FOR AND METHOD OF IN-BAND CLOCK COMPENSATION

FIELD OF THE INVENTION

The present invention relates generally to communication systems and more particularly relates to an apparatus for and a method of in-band clock compensation for use in synchronous systems comprising one or more processing modules.

BACKGROUND OF THE INVENTION

The world is currently witnessing explosive growth in the demand for communications networks and systems and it is predicted that this demand will increase in the future. Many communications systems are implemented such that data is transmitted from one component to another an a synchronous manner. For example, data transmitted between nodes in a network may be sent synchronously. In addition, it is common practice to transfer data between cards, i.e. printed circuit boards (PCBs), or modules within a communication device in a synchronous manner.

Transferring data among printed circuit cards in a synchronous system, however, requires that the same clock frequency is used in each card. Typically, each card incorporates its own clock circuit. The clock frequency generated by these different clock circuits may differ in frequency and phase from each other due to inaccuracies in the clock source used which is typically a crystal oscillator that may or may not be temperature compensated.

One prior art solution to this problem is to synchronize the clock circuits on each card in the communications device. This can be achieved using phase lock loop (PLL) circuits or another well-known frequency locking mechanism as described below.

A block diagram illustrating an example of a prior art synchronous communications device is shown in FIG. 1. The communications device, generally referenced 10, comprises ingress data 30 from an input data source and a plurality of modules 20, 22, 28. The modules may comprise any type of functional module, such as a receive module, switch module, transmit module, etc. Note that one of the modules 22 functions as a redundant module. Ingress data is input to the receive module 20 while the output of the transmit module 28 comprises the egress data 32.

Each module includes its own clock source circuitry. To achieve synchronization between cards in the device, all the clock circuits must be synchronized to a reference. The receive module 20 functions as the clock master reference for the plurality of processing modules 22 and transmit module 28. Each module 22, 28 incorporates PLL circuits 26 which function to synchronize their internal clocks to the reference frequency information 24 output by the receive module 20.

A disadvantage of this scheme, however, is that clock compensation is achieved by synchronization of all the clocks on the module internal to the device. This requires additional frequency synchronization circuitry, i.e. PLLs, which increases the complexity and cost and lowers the reliability of the communications device. It also requires the added problem of distributing a potentially high frequency clock source to a number of clock synchronization circuits. A further problem arises, if the module that houses the master clock is removed for any reason, another module must instantly take over and switch clock sources. This is very difficult to achieve and it is likely that one or more modules will experience data loss due to the difference in frequency of the clocks and the resulting difference in timing, FIFO delays processing delays, etc.

Thus there is a need for a mechanism that can compensate for the differences between the clocks in the system that does not require synchronization of all the clocks among the modules in the system.

SUMMARY OF THE INVENTION

Accordingly, the present invention provides a novel and useful apparatus for and method of in-band clock compensation. The method of the present invention is particularly useful in synchronous communication systems comprising one or more modules whereby data is transferred between them in a synchronous fashion. Each of the modules comprises an independent clock circuit that functions to generate the one or more clock signals used by the module. The invention provides the compensation between the clocks on different modules so as to enable synchronous communications despite clock source inaccuracies resulting in variations on clock frequency among the different modules.

For illustration purposes, the invention is described in the context of a communications device. Note, however, that it is not intended that the invention be limited to the examples presented herein. It is appreciated that one skilled in the art can apply the principles of the invention to other systems as well wherein a plurality of modules, each having independent clock sources, transfer data in a synchronous manner.

The clock compensation mechanism in each module is operative to compensate for the differences between the clocks among the various modules in the system. Note that the modules may represent printed circuit cards within a single device or may represent separate modules in a larger system or group of modules.

The clock compensation mechanism of the present invention is an in band mechanism wherein special clock compensation or synchronization symbols are inserted periodically into the data stream itself, as opposed to being transmitted external to the data stream. The special symbols are detected by the clock compensation mechanism in each module and the compensation method is performed thereon.

The method comprises adding additional clock sync symbols to the data stream depending on the current level of the FIFO queue on the module or card. If the FIFO level is above an upper threshold, no clock sync symbols are added. This is because a level above the upper threshold indicates that the clock on the current module is slower than that of the reference, thus it is desirable to speed the data through a bit faster to compensate.

If the FIFO level is below the upper threshold but above a lower threshold, one clock sync symbol is added to the data stream. This represents the 'do nothing' decision since a FIFO level in between the upper and lower thresholds indicates that the clock on the current module is essentially even with that of the reference, thus there is no need to compensate the clock in this case.

If the FIFO level is below the lower threshold, two clock sync symbols are added to the data stream. This is because a level below the lower threshold indicates that the clock on the current module is faster than that of the reference, thus it is desirable to slow the data a bit in order to compensate.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC), Field Programmable Gate Array (FPGA) or functionally equivalent discrete hardware components.

There is thus provided in accordance with the present invention a method of in band clock compensation for use in a synchronous data processing module, the module including a first in first out (FIFO) queue and adapted to receive an input data stream, the method comprising the steps of inserting a first number of clock sync symbols into the input data stream on a periodic basis, at the module, removing all but a second number of clock sync symbols from the input data stream, determining the level of the queue in the module, if the level is below a lower threshold, inserting a third number of clock sync symbols into the data stream, if the level is above the lower threshold and below an upper threshold, inserting a fourth number of clock sync symbols into the data stream and if the level is above the upper threshold, inserting a fifth number of clock sync symbols into the data stream.

There is also provided in accordance with the present invention an in band clock compensation system for use in a synchronous data processing module, the module including a first in first out (FIFO) queue and adapted to receive an input data stream, the system comprising means for periodically inserting a first number of clock sync symbols into the data stream, means for removing all but a second number of clock sync symbols from the input data stream and symbol stuffing means operative to insert a third number of clock sync symbols into the data stream if the level of the queue is below a lower threshold, insert a fourth number of clock sync symbols into the data stream if the level of the queue is above the lower threshold and below an upper threshold, insert a fifth number of clock sync symbols into the data stream if the level of the queue is above the upper threshold.

There is further provided in accordance with the present invention a method of in band clock compensation for use in a synchronous data processing system, the system including a plurality of processing modules each including a first in first out (FIFO) queue and adapted to receive an input data stream, the method comprising the steps of periodically inserting a first number of clock sync symbols into the data stream before being received by a first module, at each module, removing all but a second number of clock sync symbols from the input data stream, determining the level of the queue in the module, if the level is below a lower threshold, inserting a third number of clock sync symbols into the data stream, if the level is above the lower threshold and below an upper threshold, inserting a fourth number of clock sync symbols into the data stream and if the level is above the upper threshold, inserting a fifth number of clock sync symbols into the data stream.

There is also provided in accordance with the present invention an in band clock compensation system for use in a communications device comprising a receive line card adapted to periodically insert a first number of clock sync symbols into a data stream output therefrom, one or more switch cards, each switch card comprising a first first in first out (FIFO) queue and operative to remove all but a second number of clock sync symbols from the data stream and insert a third number of clock sync symbols into the data stream if the level of the first queue is below a lower threshold, insert a fourth number of clock sync symbols into the data stream if the level of the first queue is above the lower threshold and below an upper threshold, insert a fifth number of clock sync symbols into the data stream if the level of the first queue is above the upper threshold, a transmit line card comprising a second first in first out (FIFO) queue and operative to remove all but a second number of clock sync symbols from the data stream and insert a third number of clock sync symbols into the data stream if the level of the first queue is below a lower threshold, insert a fourth number of clock sync symbols into the data stream if the level of the first queue is above the lower threshold and below an upper threshold and insert a fifth number of clock sync symbols into the data stream if the level of the first queue is above the upper threshold.

There is further provided in accordance with the present invention a clock compensation apparatus for use in a synchronous data processing module comprising an input buffer for receiving an input data stream wherein one or more clock sync symbols are periodically inserted therein, means for removing all but a second number of clock sync symbols from the input data stream, a first in first out (FIFO) queue adapted to receive the input data stream, the system means for inserting a first number of clock sync symbols into the data stream, data processing operative to process the input data stream, a clock compensation mechanism operative to insert a first number of clock sync symbols into the data stream if the level of the queue is below a lower threshold, insert a second number of clock sync symbols into the data stream if the level of the queue is above the lower threshold and below an upper threshold, insert a third number of clock sync symbols into the data stream if the level of the queue is above the upper threshold, an output buffer for outputting the data stream output of the clock compensation mechanism.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| ASIC | Application Specific Integrated Circuit |
| CPU | Central Processing Unit |
| CRC | Cyclic Redundancy Check |
| CRC | Cyclic Redundancy Code |
| DSP | Digital Signal Processor |
| FIFO | First In First Out |
| FPGA | Field Programmable Gate Array |
| IP | Internet Protocol |
| PBX | Private Branch Exchange |
| PCB | Printed Circuit Board |
| PLL | Phase Lock Loop |
| SONET | Synchronous Optical Network |
| TCP | Transmission Control Protocol |

DETAILED DESCRIPTION OF THE INVENTION

The present invention is an apparatus for and a method of in-band clock compensation. The method of the present invention is particularly useful in synchronous communication systems comprising one or more modules whereby data is transferred between them in a synchronous fashion. Each of the modules comprises an independent clock circuit that functions to generate the one or more clock signals used by the module. The invention provides the compensation between the clocks on different modules so as to enable synchronous communications despite clock source inaccuracies resulting in variations on clock frequency among the different modules.

For illustration purposes, the invention is described in the context of a communications device. Note, however, that it is not intended that the invention be limited to the examples presented herein. It is appreciated that one skilled in the art can apply the principles of the invention to other systems as well wherein a plurality of modules, each having independent clock sources, transfer data in a synchronous manner.

For purposes of this specification, the term 'communications device' shall be taken to mean any physical device used for the purposes of communications such as within a network, including but not limited to, a switch, router, hub, exchange, bridge, concentrator, workstation or terminal using any suitable protocol such as Ethernet, SONET, Token Ring, TCP, IP, etc.

Figure 1:
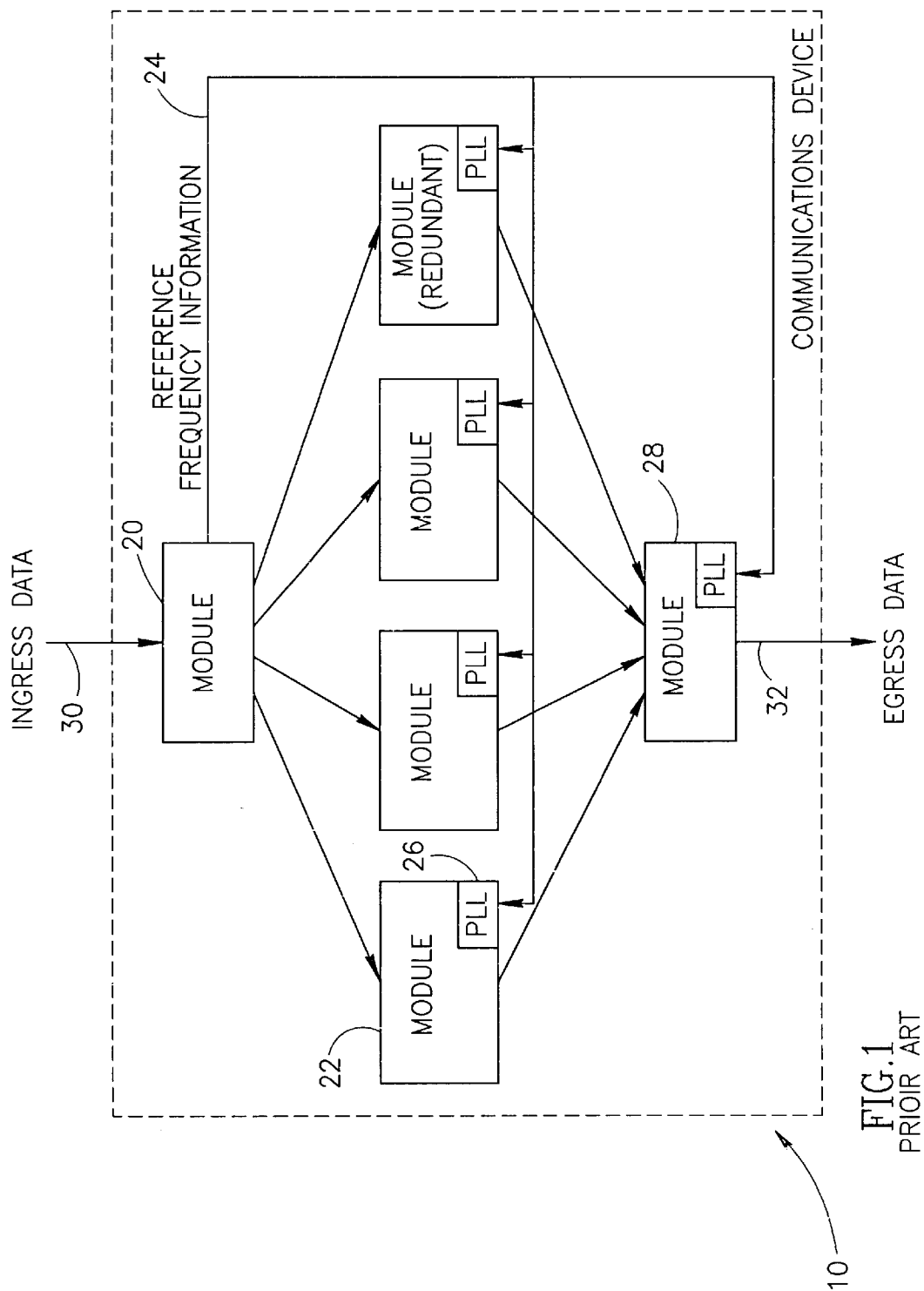
FIG. 1 is a block diagram illustrating an example of a prior art synchronous communications device.
Figure 2:
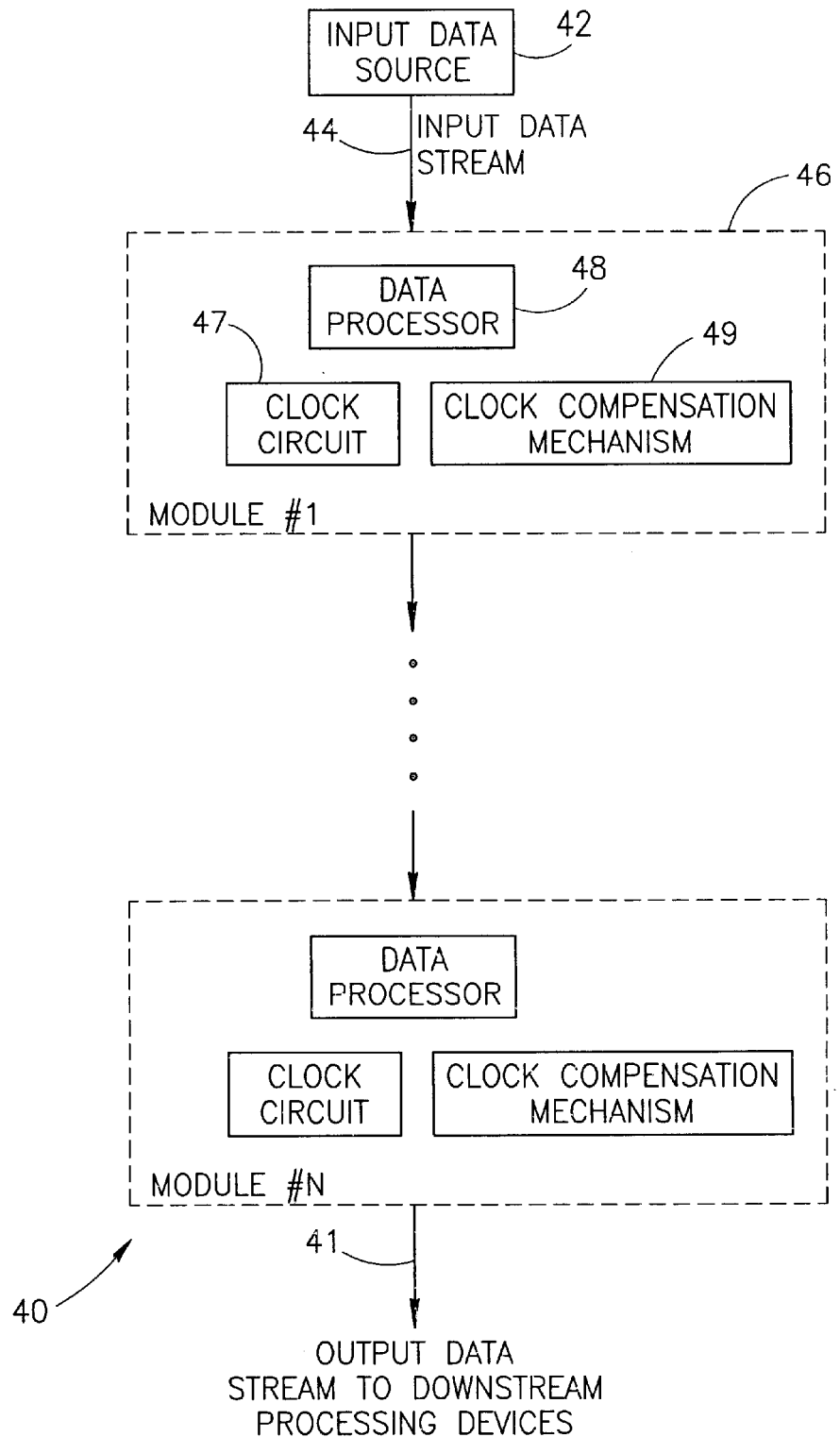
FIG. 2 is a block diagram illustrating an example synchronous system comprising a plurality of modules constructed in accordance with the present invention.

A block diagram illustrating an example synchronous system comprising a plurality of modules constructed in accordance with the present invention is shown in FIG. 2. The example system, generally referenced 40, comprises a plurality of processing modules 46, labeled module #1 through module #N and an input data source 42 operative to generate a data stream input to the first module #1. Each of the modules is adapted to comprise, inter alia, independent clock circuitry 47, a clock compensation mechanism 49 and a data processor 48 (e.g., CPU, DSP, processor core, etc.). Module #N is operative to generate the final output data stream 41 that is subsequently input to downstream processing devices (if any).

The clock circuits on each of the modules are independent of one another in that each generates its own clock signals. The clock signals generated by the clock circuits, however, are not synchronized and can vary in accordance with the tolerance of the clock source used in each module. The maximum difference in clock frequencies between any two modules is related to the degree of inaccuracy of the clocks sources which typically comprises a quartz crystal or ceramic resonator based oscillator.

In accordance with the invention, the clock compensation mechanism in each module is operative to compensate for the differences between the clocks among the various modules in the system. Note that the modules may represent printed circuit cards within a single device or may represent separate modules in a larger system or group of modules.

The clock compensation mechanism of the present invention is an in band mechanism wherein special clock compensation or synchronization symbols are inserted periodically into the data stream itself, as opposed to being transmitted external to the data stream. The special symbols are detected by the clock compensation mechanism in each module whereupon the compensation method is performed.

Figure 3:
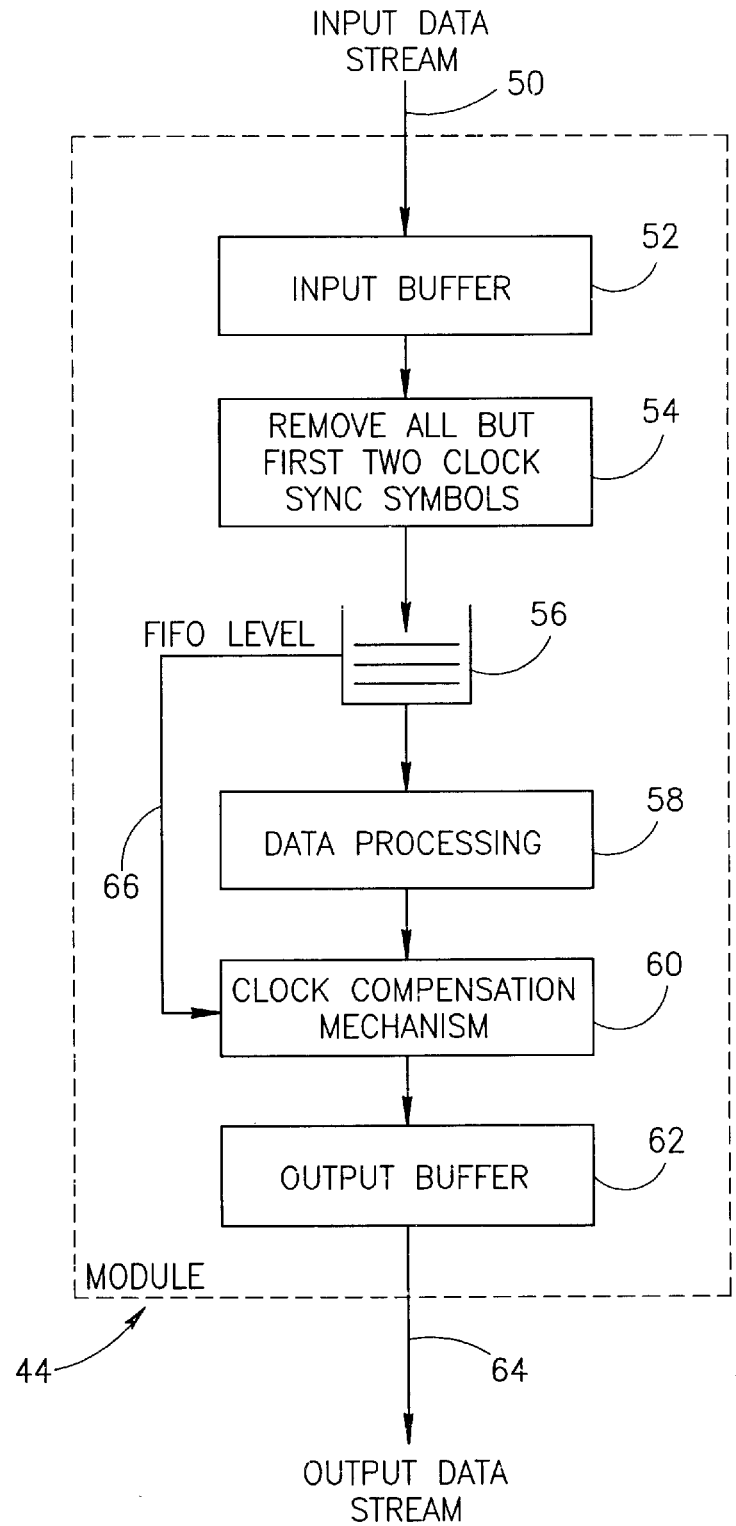
FIG. 3 is a block diagram illustrating in mode detail a module constructed to implement the clock compensation mechanism of the present invention.

A block diagram illustrating in mode detail a module constructed to implement the clock compensation mechanism of the present invention is shown in FIG. 3. The module, generally referenced 44, comprises an input buffer 52, symbol removal block 54, queue 56, data processor 58, clock compensation mechanism 60 and an output buffer 62.

In accordance with the invention, a number of clock sync symbols are inserted periodically into the data stream. The periodicity is high enough to permit the compensation of the clocks between the modules with maximum differences in clock frequency.

Then, depending on the level of the queue, additional clock sync symbols may be added depending if the level of the queue is above below or in between a lower and upper threshold. The initial insertion of clock sync symbols is performed at a point upstream to the module. Typically, the entity that inserts the initial clock sync symbols is the entity that is to be the clock reference for downstream modules and devices. In the example embodiment presented herein, the number of clock sync symbols inserted initially is three. Note, however, that the invention is not limited to a particular number, as higher numbers may be used. The invention, however, is difficult to implement with less than three initial symbols.

In operation, the input data stream 50 first enters the input buffer 52. All but the first two clock sync symbols are removed by block 54 and subsequently enter the queue 56 which comprises, for example, first in first out (FIFO) type queue. The data output of the queue is then processed in accordance with the particular communication device, module or printed circuit card. The clock compensation mechanism 60 then adds two, one or no clock sync symbols to the data stream depending on the level of the queue as indicated by the FIFO level signal 66.

If the queue level is below a lower threshold, two symbols are added to the data stream; if the queue level is between the lower threshold and an upper threshold, one symbol is added to the data stream; and if the queue level is above an upper threshold, no symbols are added to the data stream. The output of the clock compensation mechanism 60 is then buffered by the output buffer 62 before being output by the module in an output data stream 64.

Figure 4A:
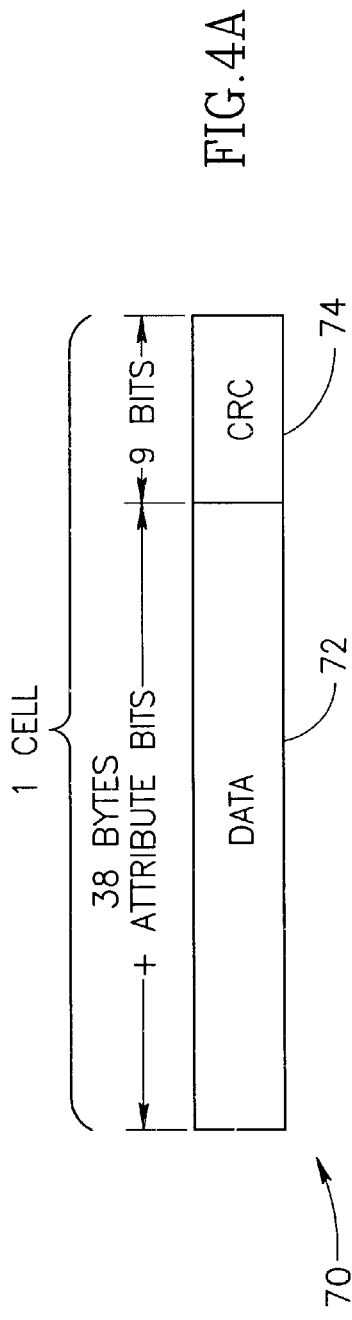
FIG. 4A is a diagram illustrating an example cell format as used without the present invention.

As described above, the compensation mechanism of the present invention operates by inserting special clock sync symbols into the data stream. In the example presented herein, the data stream comprises cells, the format of which is illustrated in FIG. 4A. The cell, generally referenced 70, comprises a 38 byte data portion 72 including one or more attribute bits and a 9 bit error check code portion 74, i.e. cyclic redundancy code (CRC).

Figure 4B:
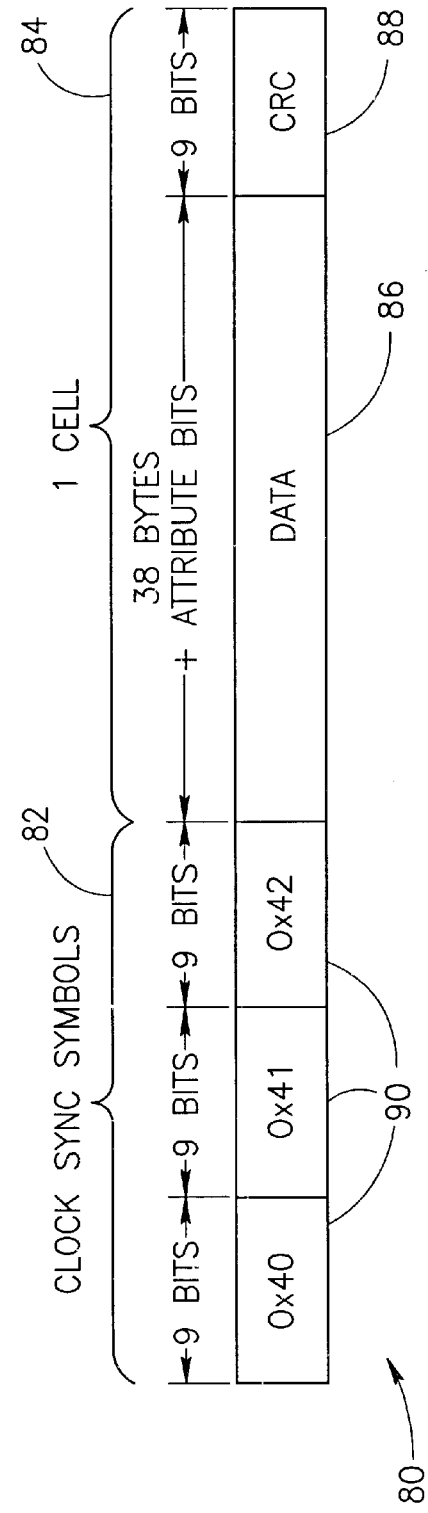
FIG. 4B is a diagram illustrating an example cell format as used with the present invention with a plurality of clock sync symbols preceding the cell.

In accordance with the invention a cell may have a maximum of four clock sync symbols added to it. In this example, the four symbols to be inserted comprise the four 9 bit values 0x040, 0x041, 0x042 and 0x043. Thus, the three initial clock sync symbols inserted into the stream n a periodic basis comprise the 9 bit values 0x040, 0x041 and 0x042. This is shown in FIG. 4B. The cell, generally referenced 80, comprises clock sync symbol portion 82 and the regular cell portion 84. The clock sync symbol portion comprises three clock sync symbols 90 while the cell portion comprises a 38 byte and attribute bits data portion 86 and a 9 bit CRC check 88.

Note that the requirement for three initial symbol is protocol dependent. Different protocols may require more or less than three symbols. In general, it is important that the clock sync symbols be distinguishable from the data. In the example system presented herein, data is transmitted in 9 bit words: 8 bits of data and 1 bit of control. Data is indicated by the 9th bit being set to '1'. Thus, the clock sync symbols will not be taken for data. Further, at least two clock sync symbols are required for correct recognition by the CRC circuit.

Figure 5:
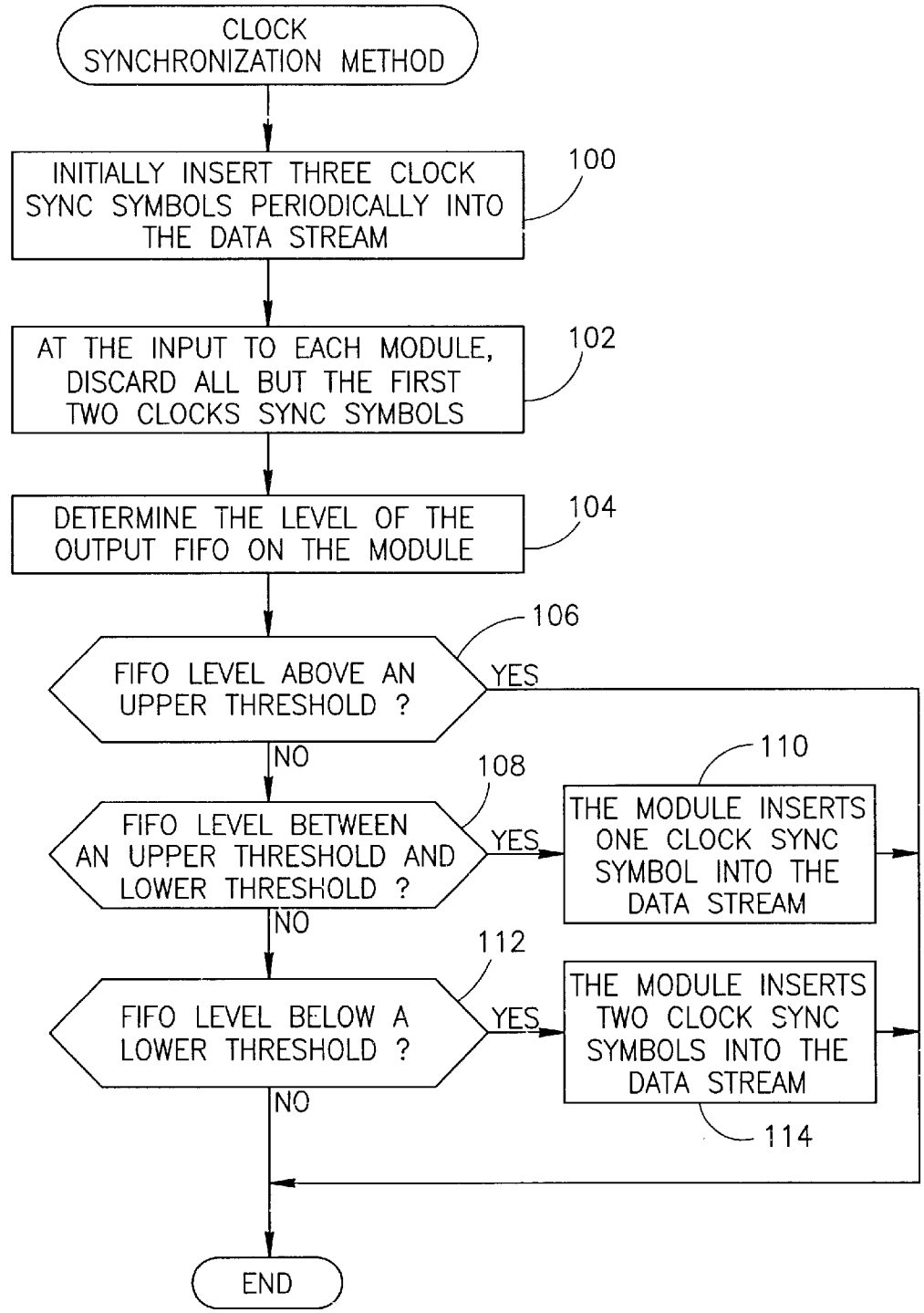
FIG. 5 is a flow diagram illustrating the clock compensation method of the present invention in more detail.

A flow diagram illustrating the clock compensation method of the present invention in more detail is shown in FIG. 5. The method can be described as a byte or symbol stuffing method whereby symbols as inserted into the data traffic streams on a periodic basis. The stuffing symbols are inserted at the beginning of a cell and become part of the cell meaning that the CRC error check calculation includes the byte stuffing symbols (step 100). The symbols are intentionally different from each other to prevent a mismatch of symbol identification on the transmit side in the event the CRC error check of the previous cell is the same value as the symbol. Note although the invention is described in the context of CRC, it is appreciated that the invention may be used with any type of error control, e.g., parity, etc. and is not limited to CRC.

In accordance with the example embodiment of the invention presented herein, the byte stuffing symbols are presented below in Table 1.

TABLE 1

| Byte Stuffing Symbols | |
|---|---|
| Byte-stuffing symbol position | Value (Hex) |
| First byte-stuffing symbol | 0x040 |
| Second byte-stuffing symbol | 0x041 |
| Third byte-stuffing symbol | 0x042 |
| Fourth byte-stuffing symbol | 0x043 |

Next, at the input to each module (or printed circuit card), all but the first two clock sync symbols are discarded (step 102). This is done in order to perform the clock compensation mechanism of the present invention at the same starting point at each module. The compensation determined for one module is independent of the compensation determined for other modules.

The level of the queue is then determined (step 104) and symbols are added in accordance therewith. If the FIFO level is above an upper threshold (step 106), no clock sync symbols are added to the two already present in the data stream. This is because a level above the upper threshold indicates that the clock on the current module is slower than that of the reference, thus it is desirable to speed the data through a bit faster to compensate.

If the FIFO level is below the upper threshold but above a lower threshold (step 108), one clock sync symbol is added to the two already present in the data stream resulting in a total of three symbols (i.e. the three symbols inserted originally) (step 110). The symbol is inserted by holding the FIFO read clock for a single clock cycle (i.e. symbol cycle) which causes the FIFO level to increase by one. Assuming that three symbols were received by the module at its input, the addition of one symbol compensates for the previous removal of the third symbol. This represents the 'do nothing' decision since a FIFO level in between the upper and lower thresholds indicates that the clock on the current module is essentially even with that of the reference, thus there is no need to compensate the clock in this case.

If the FIFO level is below the lower threshold (step 112), two clock sync symbols are added to the two already present in the data stream resulting in a total of four symbols inserted (step 114). This is because a level below the lower threshold indicates that the clock on the current module is faster than that of the reference, thus it is desirable to slow the data a bit in order to compensate.

The lower and upper thresholds may be set to any suitable levels. In one embodiment, the thresholds are set to a level equal to one half the size of the FIFO queue a plus/minus a particular number, for example two. Thus, for a queue of size 64, the lower and upper thresholds are set to 30 and 34, respectively. The value of one half +/−2 has been found to achieve acceptable performance. It is appreciated that the lower and upper thresholds may be set in other ways without departing from the scope of the present invention.

Another feature of the present invention is that it permits the modules in a system to be resistant to data loss upon swhitchover to a redundant module. Since the clock compensation method uses the in band data stream for the transmission of the clock sync symbols, a switchover to a redundant card in the event of a failure does not upset the reception and subsequent processing of the clock sync symbols.

Figure 6:
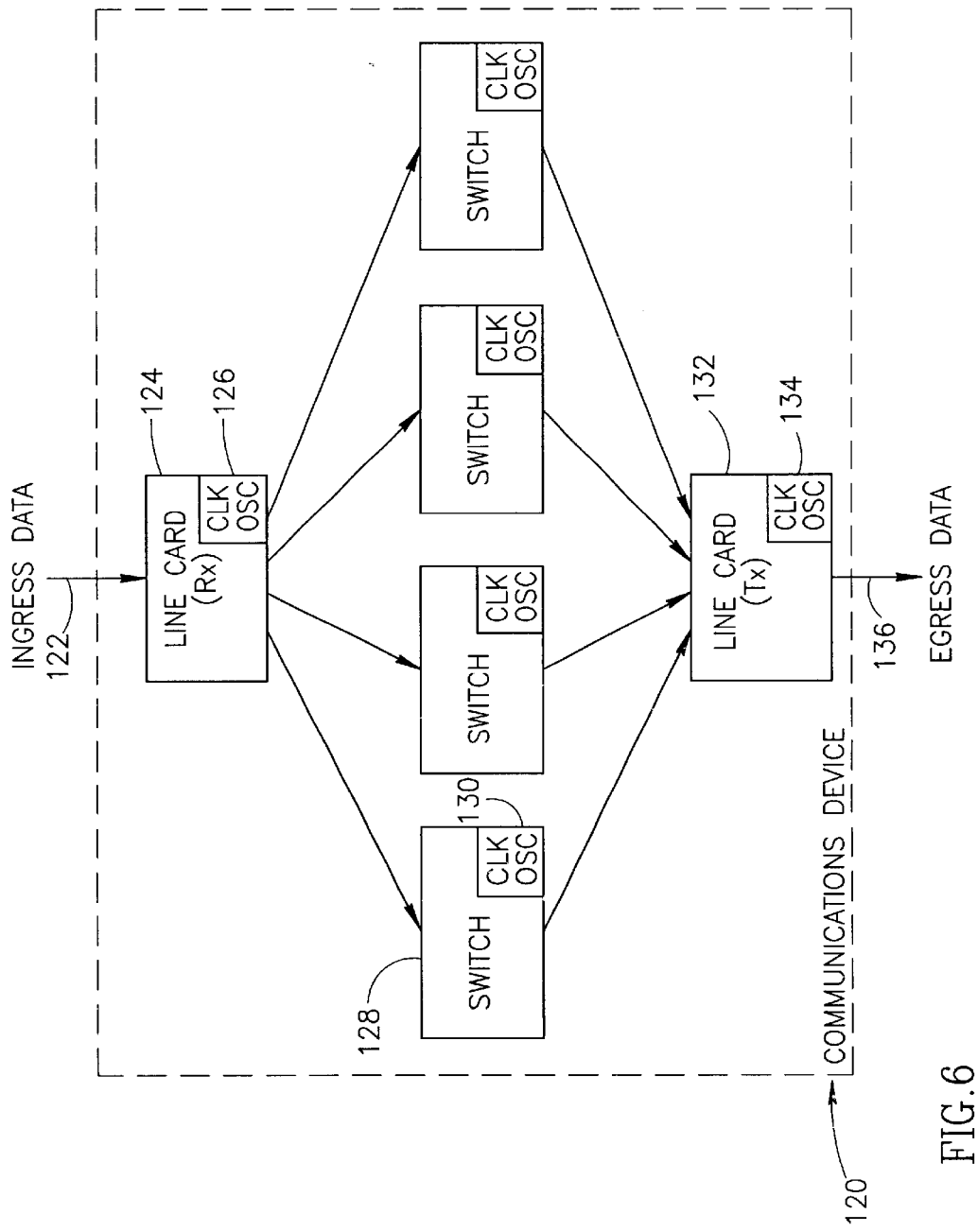
FIG. 6 is a block diagram illustrating an example synchronous communications system incorporating the clock compensation mechanism of the present invention.

A block diagram illustrating an example synchronous communications system incorporating the clock compensation mechanism of the present invention is shown in FIG. 6. The communications device, generally referenced 120, in this example embodiment is intended to represent a typical architecture of a communications processing device or system such as a switching device. Such a system may comprises a plurality of modules or printed circuit cards that are required to synchronously transmit data from one card to another. The egress data stream 136 is generated by the transmit line card 132.

The communication device 120 comprises an ingress data source 122, receive line card 124. a plurality of switch cards 128 and a transmit line card 132. The receive line card comprises a separate clock circuits containing clock oscillators 126, the switch cards also comprise separate clock oscillators 130 and likewise the transmit line card comprises separate clock oscillator 134.

In this example, 80 MHz clock oscillators are used in each of the cards. The clock of the receive line card, however, is used as the reference. Therefore, the receive line card is operative to periodically generate and insert three initial byte stuffing symbols (0x40, 0x41, 0x42) into the data stream output to the switch cards 128.

Note that the cell that arrives at the transmit line card after the byte stuffing process may have different lengths depending on the level of the queue. Depending on the implementation, different cell lengths may cause the transmit state machines to lose synchronization. To prevent this, different CRC seed values can be used to define the cell that incorporates byte stuffing symbols. The calculation of the CRC begins immediately after the byte stuffing symbols. The seed to be used is (0x199) crc (0x040) crc (0x041) crc (0x042).

A local clock frequency of 80 MHz +/−100 ppm corresponds to a clock frequency variation from 79.992 MHz to 80.008 MHz. Thus, the worst case frequency variation between two cards is 80.008 MHz−79.992 MHz =16 kHz or 62.5 microseconds. This time period represents 500 clock cycles or 128 cells. Thus, in this case the receive line card inserts three byte stuffing symbols every 128 cells at the beginning of a cell.

The operation performed at each of the switch cards is as described in connection with the flow diagram of FIG. 5. At the input of each switch card, the first two clock sync symbols are kept while the remainder are discarded. Thus, the third symbols is discarded by each of the switch cards. Then, at the output of each switch, either 2, 1 or no additional clock sync symbols are inserted depending on the level of the FIFO queue in each switch. The same is repeated at the transmit line card.

Thus, using the present invention provides a mechanism for compensating the clocks of a plurality of modules in a synchronous system that does not require the synchronization of the clocks themselves.

In alternative embodiments, the present invention may be applicable to implementations of the invention in integrated circuits or chip sets, e.g., Application Specific Integrated Circuits (ASICs), Field Programmable Gate Arrays (FPGAs), etc., wireless implementations, switching system products and transmission system products, e.g., SONET based products. For the purpose of this document, the terms switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of in band clock compensation for use in a synchronous data processing module, said module including a first in first out (FIFO) queue and adapted to receive an input data stream, said method comprising the steps of:

inserting a first number of clock sync symbols into said input data stream on a periodic basis;

at said module, removing all but a second number of clock sync symbols from said input data stream;

determining the level of said queue in said module;

if said level is below a lower threshold, inserting a third number of clock sync symbols into said data stream;

if said level is above said lower threshold and below an upper threshold, inserting a fourth number of clock sync symbols into said data stream; and if said level is above said upper threshold, inserting a fifth number of clock sync symbols into said data stream.

2. The method according to claim 1, wherein said first number comprises three.

3. The method according to claim 1, wherein said second number comprises two.

4. The method according to claim 1, wherein said third number comprises two.

5. The method according to claim 1, wherein said fourth number comprises one.

6. The method according to claim 1, wherein said fifth number comprises zero.

7. The method according to claim 1, wherein said clock sync symbols comprise bytes having predetermined values.

8. The method according to claim 1, wherein said clock sync symbols comprise bytes having values 0x40, 0x41, 0x42 and 0x43.

9. The method according to claim 1, further comprising the step of modifying an error check sequence associated with said data stream in accordance with the clock sync symbols remaining in said data stream.

10. The method according to claim 1, wherein said upper threshold and said lower threshold is set to a value one half the size of said queue plus/minus a sixth number, respectively.

11. The method according to claim 10, wherein said sixth number comprises two.

12. The method according to claim 1, wherein the periodicity of insertion of said first number of clock sync symbols is determined so as to compensate for the worst case frequency variation between two modules.

13. An in band clock compensation system for use in a synchronous data processing module, said module including a first in first out (FIFO) queue and adapted to receive an input data stream, said system comprising:

means for periodically inserting a first number of clock sync symbols into said data stream; means for removing all but a second number of clock sync symbols from said input data stream; and symbol stuffing means operative to:

insert a third number of clock sync symbols into said data stream if the level of said queue is below a lower threshold;

insert a fourth number of clock sync symbols into said data stream if the level of said queue is above said lower threshold and below an upper threshold;

insert a fifth number of clock sync symbols into said data stream if the level of said queue is above said upper threshold.

14. The system according to claim 13, wherein said first number comprises three.

15. The system according to claim 13, wherein said second number comprises two.

16. The system according to claim 13, wherein said third number comprises two.

17. The system according to claim 13, wherein said fourth number comprises one.

18. The system according to claim 13, wherein said fifth number comprises zero.

19. The system according to claim 13, wherein said clock sync symbols comprise bytes having predetermined values.

20. The system according to claim 13, wherein said clock sync symbols comprise bytes having values 0x40, 0x41, 0x42 and 0x43.

21. The system according to claim 13, further comprising means for modifying an error check sequence associated with said data stream in accordance with the clock sync symbols remaining in said data stream.

22. The system according to claim 13, wherein said upper threshold and said lower threshold is set to a value one half the size of said queue plus/minus a sixth number, respectively.

23. The system according to claim 10, wherein said sixth number comprises two.

24. The system according to claim 13, wherein the periodicity of insertion of said first number of clock sync symbols is determined so as to compensate for the worst case frequency variation between two modules.

25. A method in band clock compensation for use in a synchronous data processing system, said system including a plurality of processing modules each including a first in first out (FIFO) queue and adapted to receive an input data stream, said method comprising the steps of:

periodically inserting a first number of clock sync symbols into the data stream before being received by a first module;

at each module, removing all but a second number of clock sync symbols from said input data stream;

determining the level of said queue in said module;

if said level is below a lower threshold, inserting a third number of clock sync symbols into said data stream;

if said level is above said lower threshold and below an upper threshold, inserting a fourth number of clock sync symbols into said data stream; and if said level is above said upper threshold, inserting a fifth number of clock sync symbols into said data stream.

26. The method according to claim 25, wherein said first number comprises three.

27. The method according to claim 25, wherein said second number comprises two.

28. The method according to claim 25, wherein said third number comprises two.

29. The method according to claim 25, wherein said fourth number comprises one.

30. The method according to claim 25, wherein said fifth number comprises zero.

31. The method according to claim 25, wherein said clock sync symbols comprise bytes having predetermined values.

32. The method according to claim 25, wherein said clock sync symbols comprise bytes having values 0x40, 0x41, 0x42 and 0x43.

33. The method according to claim 25, further comprising the step of modifying an error check sequence associated with said data stream in accordance with the clock sync symbols remaining in said data stream.

34. The method according to claim 25, wherein said upper threshold and said lower threshold is set to a value one half the size of said queue plus/minus a sixth number, respectively.

35. The method according to claim 34, wherein said sixth number comprises two.

36. The method according to claim 25, wherein the periodicity of insertion of said first number of clock sync symbols is determined so as to compensate for the worst case frequency variation between two modules.

37. An in band clock compensation system for use in a communications device, comprising:

a receive line card adapted to periodically insert a first number of clock sync symbols into a data stream output therefrom; and one or more switch cards, each switch card comprising a first first in first out (FIFO) queue and operative to:

remove all but a second number of clock sync symbols from said data stream; and insert a third number of clock sync symbols into said data stream if the level of said first queue is below a lower threshold;

insert a fourth number of clock sync symbols into said data stream if the level of said first queue is above said lower threshold and below an upper threshold;

insert a fifth number of clock sync symbols into said data stream if the level of said first queue is above said upper threshold.

38. The system according to claim 37, wherein said first number comprises three.

39. The system according to claim 37, wherein said second number comprises two.

40. The system according to claim 37, wherein said third number comprises two.

41. The system according to claim 37, wherein said fourth number comprises one.

42. The system according to claim 37, wherein said fifth number comprises zero.

43. The system according to claim 37, wherein said clock sync symbols comprise bytes having predetermined values.

44. The system according to claim 37, wherein said clock sync symbols comprise bytes having values 0x40, 0x41, 0x42 and 0x43.

45. The system according to claim 37, further comprising the step of modifying an error check sequence associated with said data stream in accordance with the clock sync symbols remaining in said data stream.

46. The system according to claim 37, wherein said upper threshold and said lower threshold is set to a value one half the size of said queue plus/minus a sixth number, respectively.

47. The system according to claim 46, wherein said sixth number comprises two.

48. The system according to claim 37, wherein the periodicity of insertion of said first number of clock sync symbols is determined so as to compensate for the worst case frequency variation between two modules.

49. The system according to claim 37, further comprising a transmit line card comprising a second first in first out (FIFO) queue, said transmit line card comprising means operative to:

remove all but a second number of clock sync symbols from said data stream; and insert a third number of clock sync symbols into said data stream if the level of said first queue is below a lower threshold;

insert a fourth number of clock sync symbols into said data stream if the level of said first queue is above said lower threshold and below an upper threshold; and insert a fifth number of clock sync symbols into said data stream if the level of said first queue is above said upper threshold.

50. A clock compensation apparatus for use in a synchronous data processing module, comprising:

an input buffer for receiving an input data stream wherein one or more clock sync symbols are periodically inserted therein;

means for removing all but a second number of clock sync symbols from said input data stream;

a first in first out (FIFO) queue adapted to receive said input data stream, said system means for inserting a first number of clock sync symbols into said data stream;

data processing operative to process said input data stream;

a clock compensation mechanism operative to:

insert a first number of clock sync symbols into said data stream if the level of said queue is below a lower threshold;

insert a second number of clock sync symbols into said data stream if the level of said queue is above said lower threshold and below an upper threshold;

insert a third number of clock sync symbols into said data stream if the level of said queue is above said upper threshold;

an output buffer for outputting the data stream output of said clock compensation mechanism.

\* \* \* \* \*

UNITED STATES PATENT AND TRADEMARK OFFICE
CERTIFICATE OF CORRECTION

PATENT NO. : 6,807,638 B1
DATED : October 19, 2004
INVENTOR(S) : Moyal et al.

It is certified that error appears in the above-identified patent and that said Letters Patent is hereby corrected as shown below:

Title page, Item [54] and Column 1, line 2,
Title, after "COMPENSATION" insert -- BY PERIODICALLY INSERTING AND MODIFYING THE NUMBER CLOCK SYNC SYMBOLS IN A DATA STREAM --.

Title page,
Item [75], Inventors, delete "Han Glaser" and insert -- Ilan Glaser --, therefor.

Column 1,
Line 17, delete "an" and insert -- in --, therefor.

Column 3,
Line 59, after "a" delete "first".

Column 7,
Line 9, after "stream" delete "n" and insert -- on --, therefor.

Column 8,
Line 27, after "queue" delete "a".
Line 30, delete "+/−" and insert -- +/- --, therefor.
Line 36, delete "swhitchover" and insert -- switchover --, therefor.
Line 54, after "124" delete "." and insert -- , --, therefor.

Column 9,
Line 9, delete "+/−" and insert -- +/- --, therefor.
Line 12, delete "16 kHz" and insert -- 16 KHz --, therefor.

Column 11,
Line 13, delete "claim 10" and insert -- claim 13 --, therefor.

UNITED STATES PATENT AND TRADEMARK OFFICE
CERTIFICATE OF CORRECTION

PATENT NO. : 6,807,638 B1
DATED : October 19, 2004
INVENTOR(S) : Moyal et al.

It is certified that error appears in the above-identified patent and that said Letters Patent is hereby corrected as shown below:

Column 12,
Line 9, delete "first first" and insert -- first --, therefor.

Signed and Sealed this

Twenty-second Day of March, 2005

JON W. DUDAS
*Director of the United States Patent and Trademark Office*